US008667825B2

(12) United States Patent
Eto

(10) Patent No.: US 8,667,825 B2
(45) Date of Patent: Mar. 11, 2014

(54) COIL SPRING FORMING APPARATUS AND COIL SPRING FORMED THEREBY

(75) Inventor: Takashi Eto, Ichihara (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 13/620,113

(22) Filed: Sep. 14, 2012

(65) Prior Publication Data

US 2013/0062821 A1    Mar. 14, 2013

Related U.S. Application Data

(63) Continuation of application No. 12/513,845, filed as application No. PCT/JP2007/071301 on Nov. 1, 2007, now Pat. No. 8,341,993.

(30) Foreign Application Priority Data

Nov. 6, 2006    (JP) ................................. 2006-300210

(51) Int. Cl.
    *B21F 3/04*    (2006.01)
(52) U.S. Cl.
    USPC ................. 72/143; 72/144; 72/371; 140/71 C
(58) Field of Classification Search
    USPC ........... 72/135, 138, 139, 142, 143, 144, 145, 72/371; 140/71 C, 103
    See application file for complete search history.

(56) References Cited

U.S. PATENT DOCUMENTS

| 1,504,849 | A | * | 8/1924 | Whitmore et al. | ............. 72/20.2 |
| 2,165,411 | A | | 7/1939 | Peyton | |
| 2,455,863 | A | * | 12/1948 | Halvorsen | ....................... 72/131 |
| 2,491,228 | A | * | 12/1949 | Swift | .............................. 226/36 |
| 2,868,267 | A | * | 1/1959 | Platt | .................................. 72/43 |
| 3,610,006 | A | | 10/1971 | Scheublein, Jr. et al. | |

(Continued)

FOREIGN PATENT DOCUMENTS

| JP | 48-84834 | 10/1973 |
| JP | 58-31864 | 2/1983 |

(Continued)

OTHER PUBLICATIONS

Office Action for corresponding Japanese Application No. 2006-300210 dated Dec. 22, 2009.

(Continued)

*Primary Examiner* — Edward Tolan
(74) *Attorney, Agent, or Firm* — Knobbe Martens Olson & Bear LLP

(57) ABSTRACT

A coil spring forming apparatus including a core bar 2 which rotates around an axis thereof and on which a wire material W fed from a wire material-feeding means is wound; a clamping portion 22 which rotates integrally with the core bar 2 and grips an end of the wire material W on the core bar 2; and first guide rollers 30 and second guide rollers 40 for guiding the wire material W onto the core bar 2; wherein the first guide rollers 30 and the second guide rollers 40 are provided so as to move independently from each other in parallel with the axis of the core bar 2, and a coil spring formed by the above coil spring forming apparatus.

6 Claims, 16 Drawing Sheets

(56) References Cited

U.S. PATENT DOCUMENTS

| | | | |
|---|---|---|---|
| 4,058,997 A | * | 11/1977 | Siegwart .......................... 72/50 |
| 4,287,743 A | * | 9/1981 | Hantschk ......................... 72/98 |
| 4,528,831 A | * | 7/1985 | Russell et al. .................. 72/131 |
| 4,543,808 A | | 10/1985 | Nilsson et al. |
| 4,715,202 A | | 12/1987 | Shibata et al. |
| 4,929,167 A | * | 5/1990 | Pepper .......................... 425/325 |
| 4,945,744 A | | 8/1990 | Lienert |
| 5,927,123 A | | 7/1999 | Liu |

FOREIGN PATENT DOCUMENTS

| | | |
|---|---|---|
| JP | 60-102242 | 6/1985 |
| JP | 02-33460 | 7/1990 |
| JP | 09-182930 | 7/1997 |
| JP | 2002-143962 | 5/2002 |

OTHER PUBLICATIONS

International Search Report dated Jan. 8, 2008.

\* cited by examiner

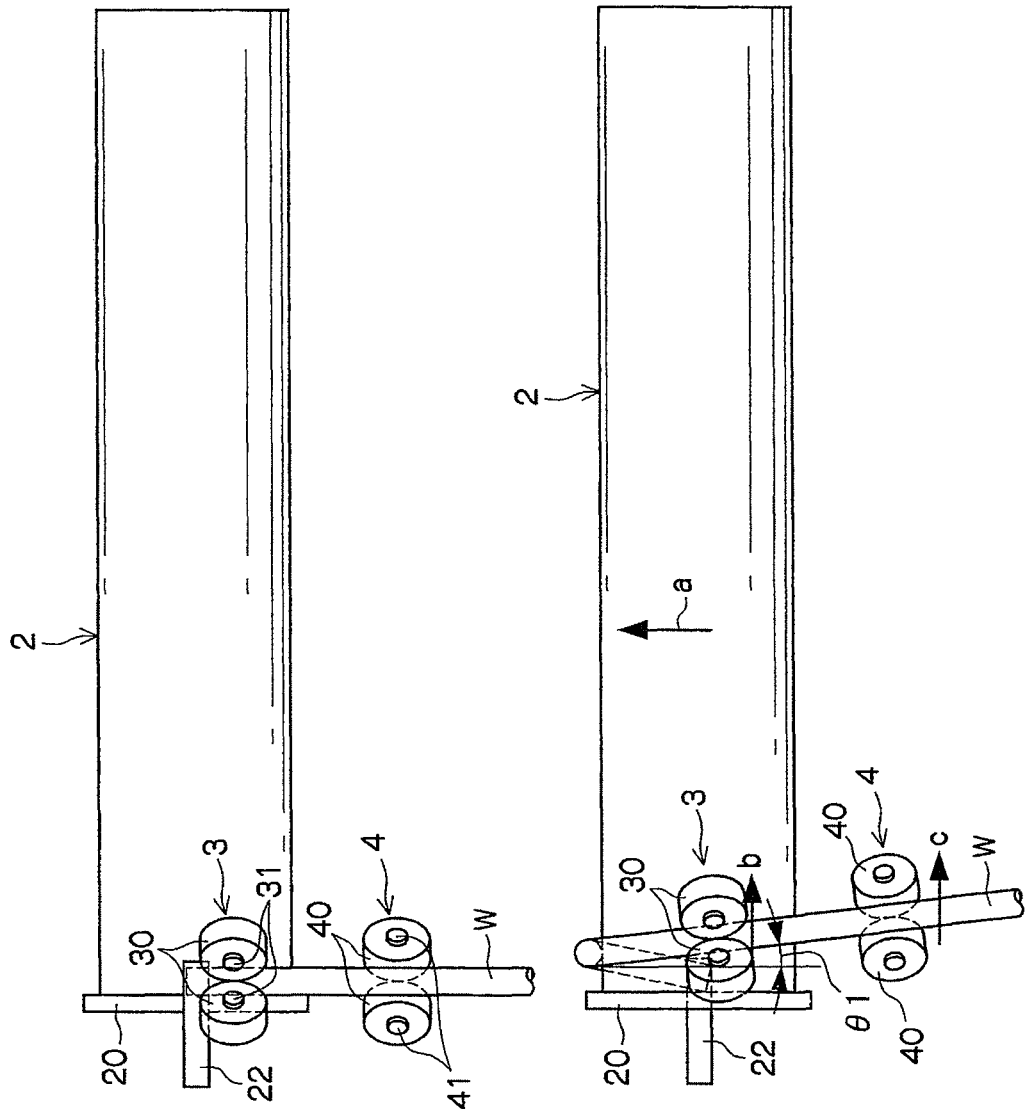

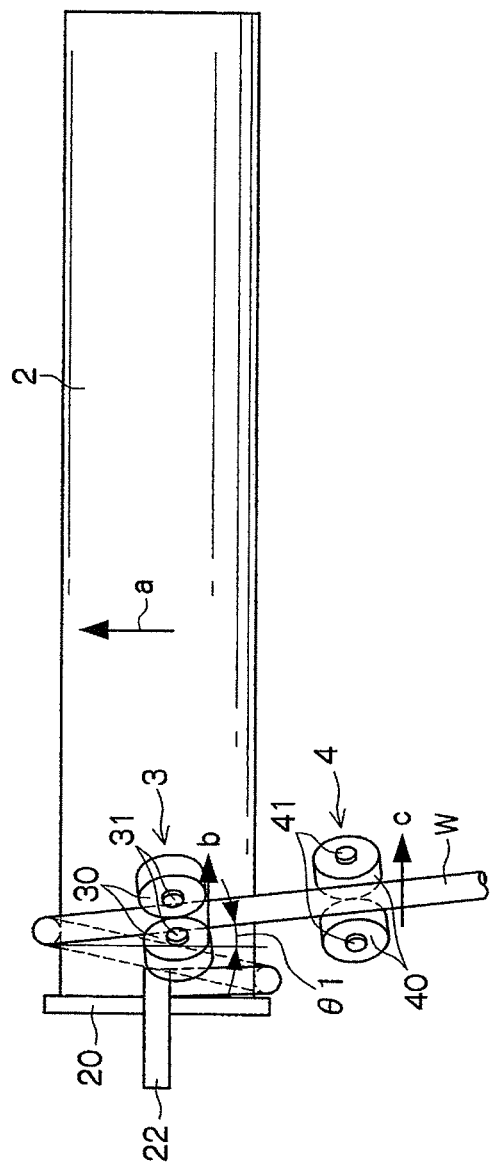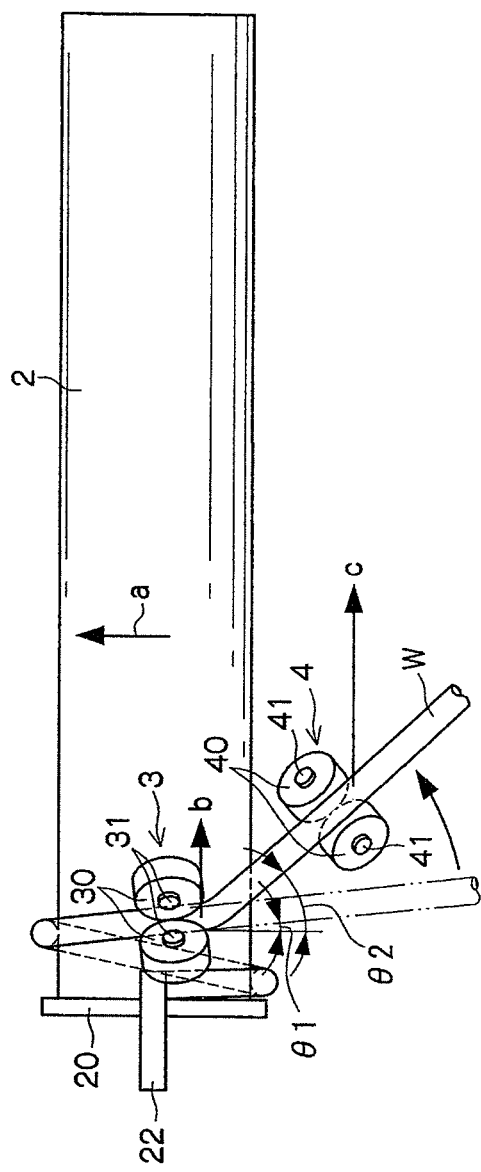
Fig.8A
Fig.8B

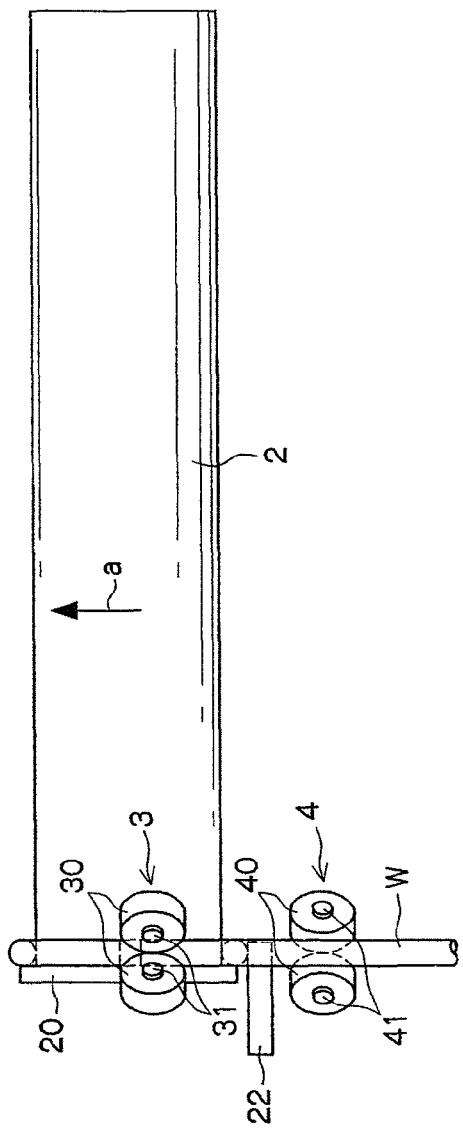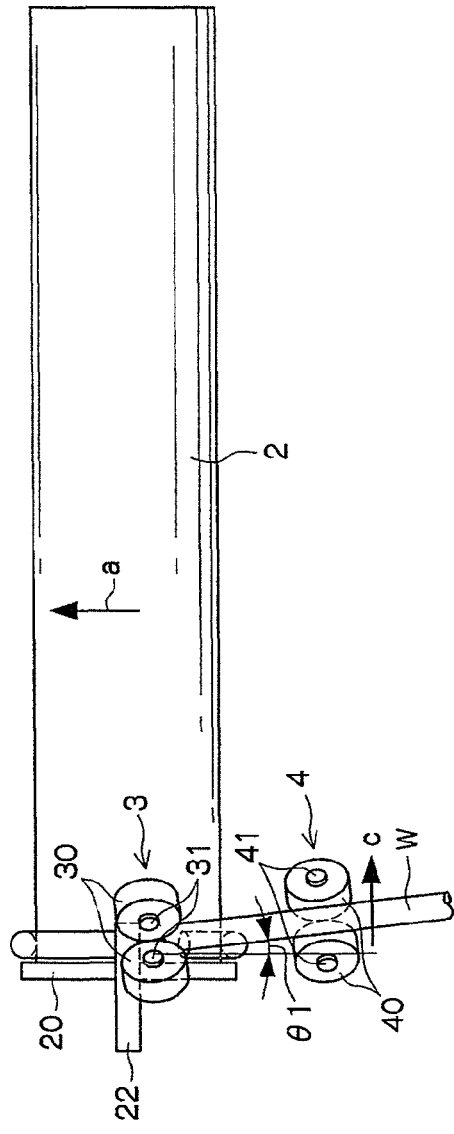

COIL SPRING FORMING APPARATUS AND COIL SPRING FORMED THEREBY

CROSS REFERENCE TO RELATED APPLICATIONS

This application is a continuation of U.S. application Ser. No. 12/513,845, filed on May 6, 2009 as the U.S. National Phase under 35 U.S.C. §371 of International Application PCT/JP2007/071301, filed Nov. 1, 2007, which claims priority to Japanese Patent Application No. 2006-300210, filed Nov. 6, 2006, which are hereby incorporated by reference in their entirety.

TECHNICAL FIELD

This invention relates to a coil spring forming apparatus and coil springs. More specifically, the invention relates to a coil spring forming apparatus capable of correctly forming coil springs of various pitches and pitch angles and coil springs formed by the same coil spring forming apparatus.

BACKGROUND ART

A known coil spring forming apparatus comprises, for example, a core bar and a lead screw provided in parallel with the core bar. The lead screw of the coil spring forming apparatus has a spiral groove that is formed so as to correspond to a pitch and a pitch angle of a coil spring that is to be formed. In the above coil spring forming apparatus, the core bar and the lead screw are rotated, the wire material is guided on the core bar by the spiral groove of the lead screw, and the wire material is wound round the core bar in a predetermined pitch and a pitch angle to manufacture a coil spring.

However, the above coil spring forming apparatus involves various problems such as requiring laborious work to design and fabricate the lead screw, lacking general applicability, i.e., being capable of forming only a coil spring having a pitch and a pitch angle corresponding to the spiral groove of the lead screw, and it being very difficult to produce coil springs having a pitch or a pitch angle changing greatly at a midway point.

Consequently, a coil winding machine employing a pulley-like guide in place of the above lead screw has been developed. The coil winding machine has a core bar and a pulley-like guide arranged at a position separated away from the core bar in the radial direction thereof, and the pulley-like guide moves along the axial direction of the core bar at a predetermined speed. The wire material is wound round the core bar while being guided by the pulley-like guide. Here, the pitch and the pitch angle of the coil spring that is to be obtained is controlled by controlling the moving speed of the pulley-like guide.

In the above coil winding machine, however, the pulley-like guide is disposed at a position separated away from the core bar, and the wire material is not directly guided onto the core bar. Therefore, while estimating the pitch and the pitch angle of the wire material that is actually wound on the core bar, the motion of the pulley-like guide must be controlled in accordance with the estimated pitch and pitch angle.

Therefore, laborious work is required for preparing input data for controlling the pulley-like guide and, furthermore, the pitch of the obtained coil spring varies. Further, since the pulley-like guide and the core bar are separated away from each other, it is not possible to directly control the motion of the wire material on the core bar. When attempting to form a coil spring having a pitch that sharply varies, therefore, it is difficult to have the motion of the guide follow the change in the pitch. When attempting to forcibly move the guide so as to follow the change in the pitch, the wire material slips on the core bar, causing variation in the pitch.

In order to solve the problems of the above coil winding machine, there has been proposed a coil winding machine comprising a core bar, a core bar drive mechanism, a chuck for gripping an end of a wire material so as to fix it on the core bar, a guide member arranged in parallel with the core bar, a moving head being held by the guide member so as to move in a direction parallel with the core bar, a first holder being provided on the moving head so as to move reciprocally toward or away from the core bar and to rotate around an axis which extends in the radial direction of the core bar, a guide drive mechanism reciprocally driving the first holder toward or away from the core bar, a first guide being provided on the first holder and having a groove portion that fits the material of a coil spring, an axial drive mechanism driving the moving head so that the first guide moves in the axial direction of the core bar in accordance with the pitch of the coil spring at a speed corresponding to the rotational speed of the core bar, a second holder turning together with the first holder, a second guide being provided on the second holder, coming in rotational contact with the material so as to prevent the material from detaching, and feeding the material toward the first guide, and an angle-varying actuator controlling the direction of the holder to direct the first guide and the second guide so that the first guide and the second guide interlock and face a direction corresponding to a pitch angle of the coil spring (patent document 1).

[Patent document 1] JP-B-2-33460

DISCLOSURE OF THE INVENTION

Problems to be Solved by the Invention

In the above coil winding machine, after the end of the wire material is gripped by the chuck and fixed onto the core bar, winding of the wire material is started. As described above, however, the first guide is provided on the first holder that approaches or separates away from the core bar, and the second guide, which guides the wire material in cooperation with the first guide, is provided on the second holder that turns integrally with the first holder. At the start of winding the wire material, therefore, the first guide and the second guide must be retreated to a position that is separated away from the core bar. Accordingly, right after the start of winding the wire material, it is difficult to correctly control the shape of the coil spring.

Additionally, the first holder and the second holder are only capable to rotate integrally with each other around the axis extending in the radial direction of the core bar, and thus, positional relationship between the first guide and the second guide is limited. Consequently, limitation is inevitably imposed on the pitch and on the pitch angle of the coil spring to be produced.

The present invention was achieved in order to solve the above problems and has an object of providing a coil spring forming apparatus capable of correctly producing coil springs having various pitches and pitch angles.

Means for Solving the Problem

According to a first aspect of the invention, there is provided a coil spring forming apparatus comprising:

a core bar rotating around an axis thereof and on which a wire material fed from a wire material-feeding means is wound;

a clamping portion rotating integrally with the core bar and grips an end of the wire material on the core bar; and a first guide member and a second guide member guiding the wire material onto the core bar;

wherein the first guide member and the second guide member are provided so as to move independently from each other in parallel with the axis of the core bar.

In the above coil spring forming apparatus, the wire material fed from the wire material-feeding means is guided by the second guide member and the first guide member toward a position where the winding starts on the core bar. An end portion of the wire material is fixed onto the core bar by the clamping portion.

After the end of the wire material is fixed onto the core bar, the core bar rotates in a direction in which a coil spring is wound and, at the same time, the first guide member and the second guide member move in parallel with the axis of the core bar to guide the wire material so as to be wound on the core bar maintaining a predetermined pitch and a predetermined pitch angle.

In the coil spring forming apparatus, the first guide member and the second guide member are moved at an equal and constant speed to form the coil spring of a predetermined pitch and a pitch angle. Further, while moving the first and the second guide members at an equal speed, by increasing the speed thereof, the pitch and the pitch angle can be increased in the direction in which the first guide member and the second guide member move. Conversely, while moving the first and the second guide members at an equal speed, by decreasing the speed thereof, the pitch and the pitch angle can be decreased in the direction which the first guide member and the second guide member move.

Further, by moving the second guide member at a speed higher than the first guide member while moving the first guide member at a predetermined speed, the wire material is bent with the first guide member as a center, and the wire material is wound at a larger pitch and a larger pitch angle in a portion downstream of the bending portion of the wire material in the direction in which the first guide member and the second guide member move. Conversely, by moving the second guide member at a speed lower than the first guide member while moving the first guide member at a predetermined speed, the wire material is wound at a smaller pitch and a smaller pitch angle in a portion downstream of the bending portion in the direction in which the first and the second guide members move.

By setting the moving speeds of the first guide member and the second guide member in the coil spring forming apparatus as described above, it is made possible to form not only a coil spring having a constant pitch but also a coil spring having a pitch increases or decreases in the axial direction thereof, and coil springs having larger or smaller pitch and pitch angle in a portion downstream from a predetermined point.

According to a second aspect of the invention, there is provided the coil spring forming apparatus of the first aspect, wherein, of the first guide member and the second guide member, the first guide member disposed on the side closer to the core bar holds a portion of the wire material adjacent to the portion of the wire material clamped by the clamping portion on the core bar at the start of winding of the wire material.

In the above coil spring forming apparatus, the first guide member holds a position of the wire material that is offset toward the side close to the wire material-feeding means from the position of starting the winding at the start of winding.

Therefore, the wire material is guided by the first guide member and the second guide member along a predetermined passage from the start of winding, and thus, the pitch and the pitch angle of the coil spring can be correctly controlled even at the start of winding. Consequently, it is made possible to correctly form a coil spring having flat seats at both ends thereof like a suspension coil spring for automobiles.

According to a third aspect of the invention, there is provided the coil spring forming apparatus of the first or second aspect, wherein the first guide member and the second guide member are each provided with a pair of guide rollers arranged so as to sandwich the wire material passage therebetween, the guide rollers of the first guide member come in contact with the wire material from the upper side, and the guide rollers of the second guide member come in contact with the wire material from the lower side.

In the above coil spring forming apparatus, the first guide member and the second guide member are each provided with the pair of guide rollers arranged so as to hold the wire material passage therebetween. Therefore, both the first and the second guide members are capable of smoothly feeding the wire material regardless of their angles relative to the wire material. Further, since the first guide member located on the side close to the core bar pushes the wire material from the upper side, the coil spring can be formed more constantly.

According to a fourth aspect of the invention, there is provided the coil spring forming apparatus of the first or second aspect, wherein the second guide member comprises a pair of guide rollers that are arranged so as to sandwich the wire material passage therebetween, and the first guide member comprises a guide roller having a groove that fits the wire material and a guide roller support member supporting the guide roller so as to rotate around the axis of the guide roller, the guide roller support member being rotatable around an axis which is at a right angle with the axis of the guide roller and at a right angle with the wire material feed passage.

In the above coil spring forming apparatus, the wire material can be smoothly delivered regardless of the angle between the second guide member and the wire material, and thus, the wire material is not bent at the second guide member even when the first guide member and the second guide member are driven at different speeds. In the above coil apparatus, further, if the first guide member and the second guide member are driven at different speeds, the wire material is bent at the position of the first guide member and in this case, a force urging the wire material to get out of the groove of the guide roller acts between the wire material and the guide roller. However, in the first guide member, the guide roller support member rotates around the rotary axis so that the direction of the groove of the guide roller coincides with the direction of the wire material that has been bent. Therefore, it is presented from happen that the wire material gets out of the guide roller by the above-mentioned force, and that the wire material is rubbed so strongly onto the groove of the guide roller that the guide roller is damaged.

According to a fifth aspect of the invention, there is provided a coil spring formed by the coil spring forming apparatus of any one of the first to fourth aspects.

Effect of the Invention

As described above, the present invention provides the coil spring forming apparatus capable of correctly producing coil springs having various pitches and pitch angles.

BRIEF DESCRIPTION OF THE DRAWINGS

FIG. 7A is a view illustrating the motions of the first guide roller and the second guide roller at the start of winding by feeding a wire material to a core bar in the coil winding machine of FIG. 1.

FIG. 7B is a view illustrating the motions of the first guide roller and the second guide roller when the wire material is wound on the core bar at a pitch angle θ1 in the coil winding machine of FIG. 1.

FIG. 8A is a view illustrating the motions of the first guide roller and the second guide roller just before changing the pitch angle from θ1 to θ2 in the coil winding machine of FIG. 1.

FIG. 8B is a view illustrating the motions of the first guide roller and the second guide roller when the pitch angle is being changed from θ1 to θ2 in the coil winding machine of FIG. 1.

FIG. 9A is a view illustrating the motions of the first guide roller and the second guide roller at the time of forming flat seats at the ends of a coil spring in the coil winding machine of FIG. 1.

FIG. 9B is a view illustrating the motions of the first guide roller and the second guide roller when the wire material is to be wound on the core bar at the pitch angle θ1 after the flat seats have been formed at the ends of the coil spring in the coil winding machine of FIG. 1.

BEST MODE FOR CARRYING OUT THE INVENTION

1. Embodiment 1

A coil winding machine which is an example of the coil spring forming apparatus of the invention will be now described below.

Figure 1:
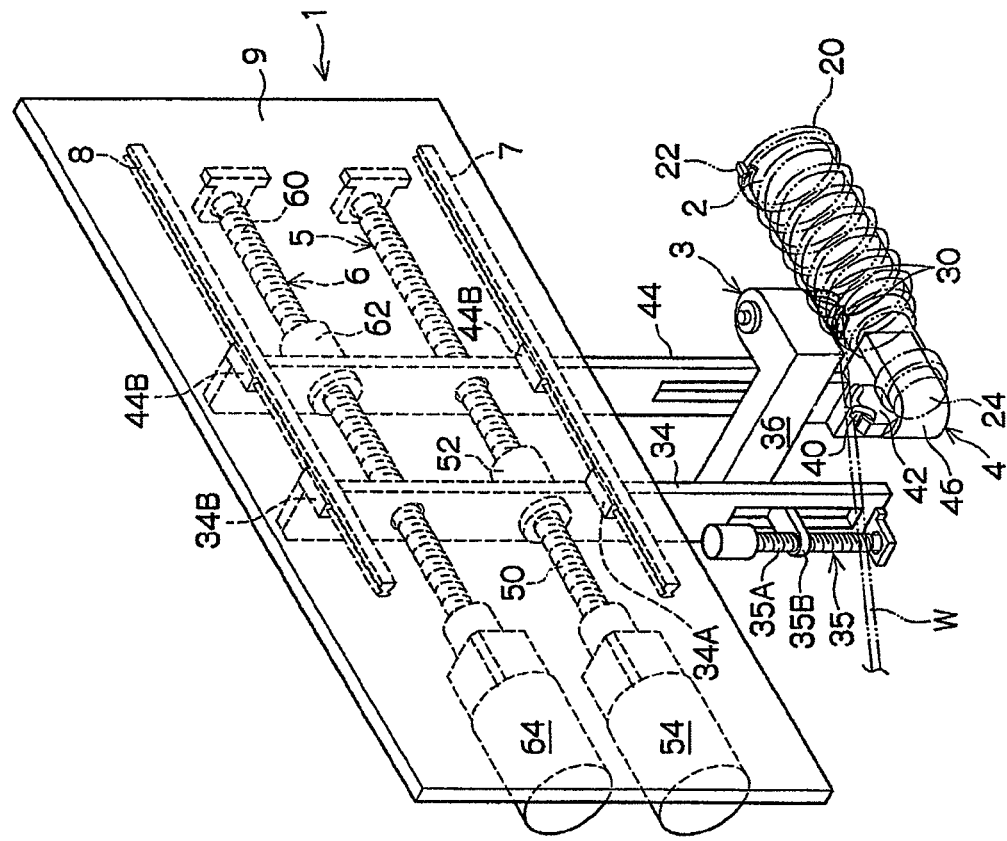
FIG. 1 is a perspective view showing the whole constitution of a coil winding machine according to an embodiment 1.
Figure 2:
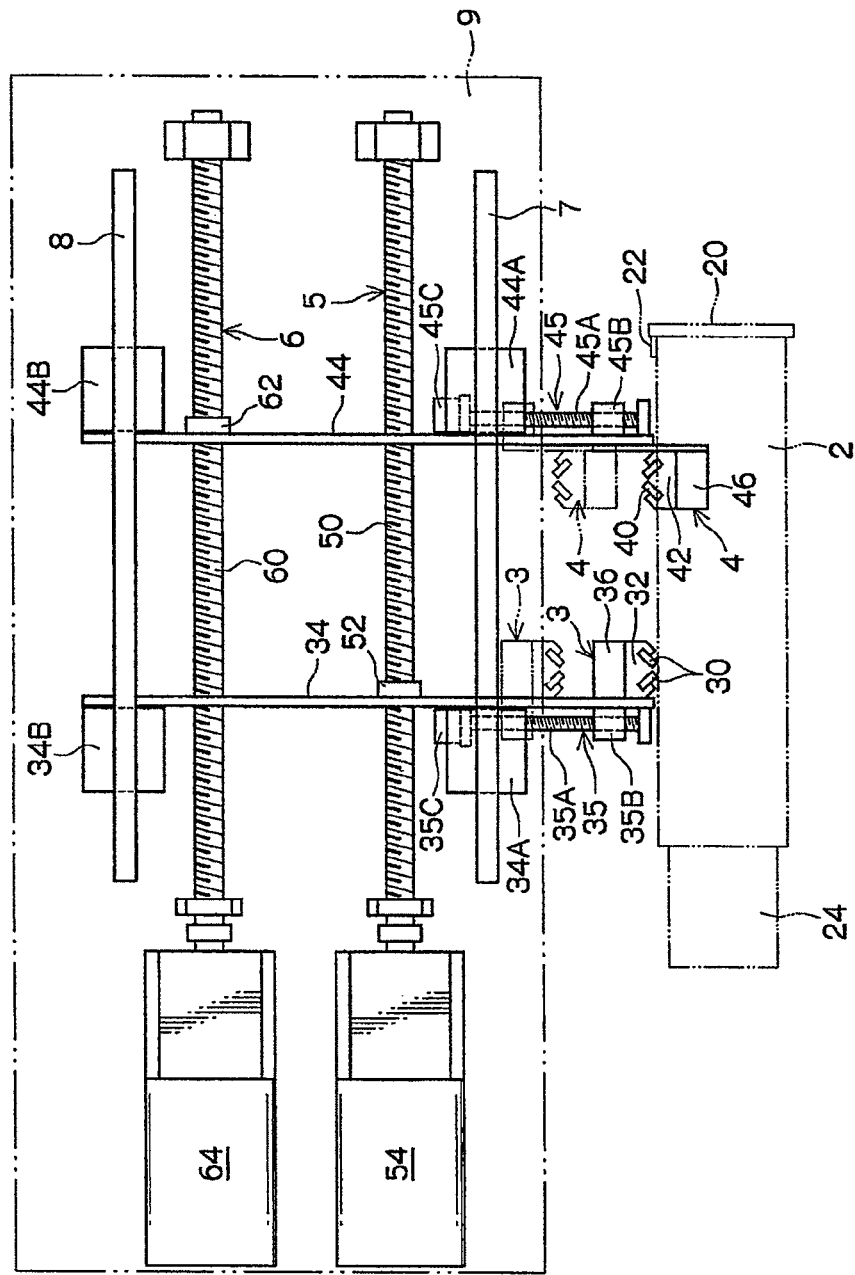
FIG. 2 is a front view showing the whole constitution of the coil winding machine according to the embodiment 1.

As shown in FIGS. 1 and 2, the coil winding machine 1 according to the embodiment 1 includes a cylindrical core bar 2 on which a wire material W will be wound, and a first guide portion 3 and a second guide portion 4 for guiding the wire material W fed from feeding means (not shown) toward the core bar 2.

The first guide portion 3 and the second guide portion 4 are driven in parallel with the axis of the core bar 2 by, a ball screw mechanism 5 and a ball screw mechanism 6. The ball screw mechanism 5 and the ball screw mechanism 6 are provided on a plate-like board 9 disposed in parallel with the core bar 2. A guide rail 7 is provided at a lower edge portion on the surface of the board 9 on which the ball screw mechanism 5 and the ball screw mechanism 6 are provided in parallel with the core bar 2, and a guide rail 8 is provided near the upper edge portion on the above surface. Lower edge portions of the first guide portion 3 and the second guide portion 4 slidably engage with the guide rail 7, and upper edge portions of the first guide portion 3 and the second guide portion 4 slidably engage with the guide rail 8. Therefore, the first guide portion 3 and the second guide portion 4 move on a plane in parallel with the board 9.

Each of the portions of the coil winding machine 1 will be described below in detail.

Figure 3:
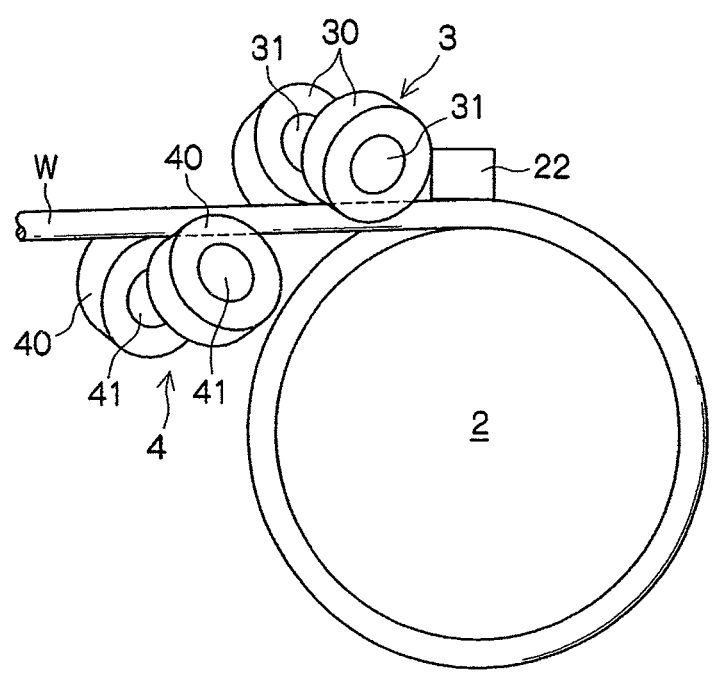
FIG. 3 is a schematic view showing the constitution of a first guide roller, a second guide roller, a core bar and peripheries thereof in the coil winding machine according to the embodiment 1.
Figure 4:
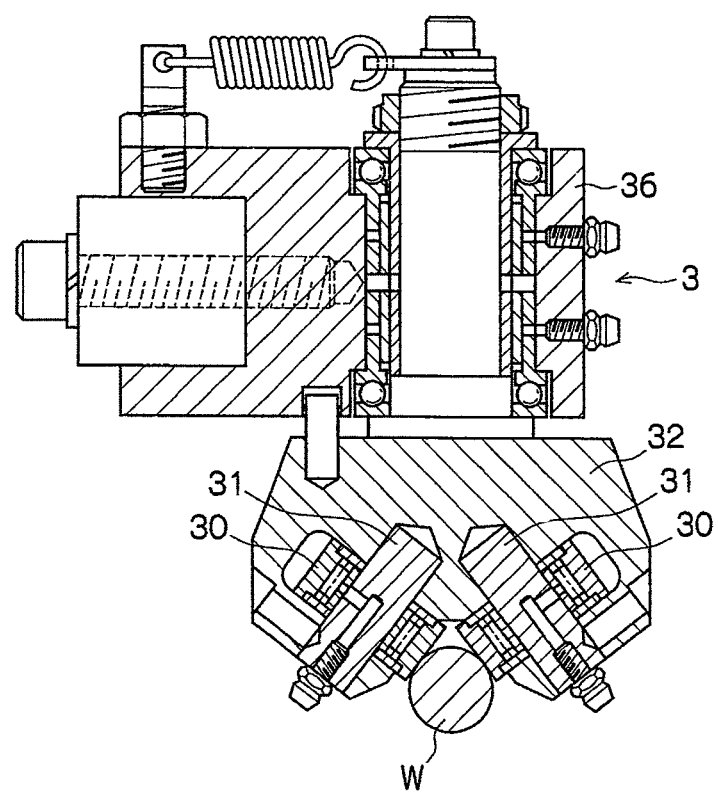
FIG. 4 is a sectional view showing, on an enlarged scale, the constitution of the first guide roller and the peripheries thereof in the coil winding machine of FIG. 1.
Figure 5:
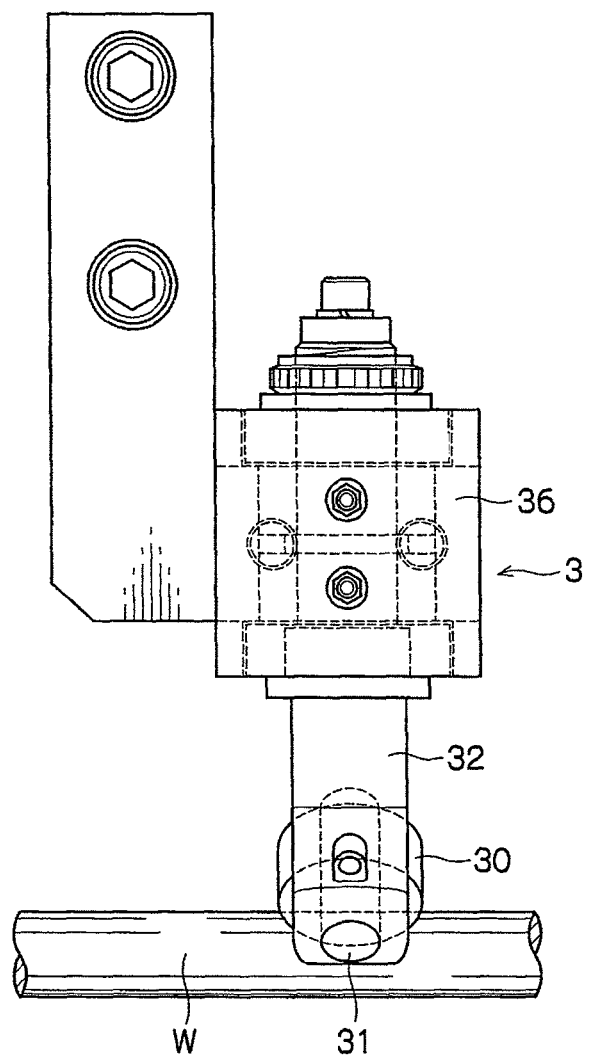
FIG. 5 is an enlarged side view showing the constitution of the first guide roller and the peripheries thereof in the coil winding machine of FIG. 1.
Figure 6:
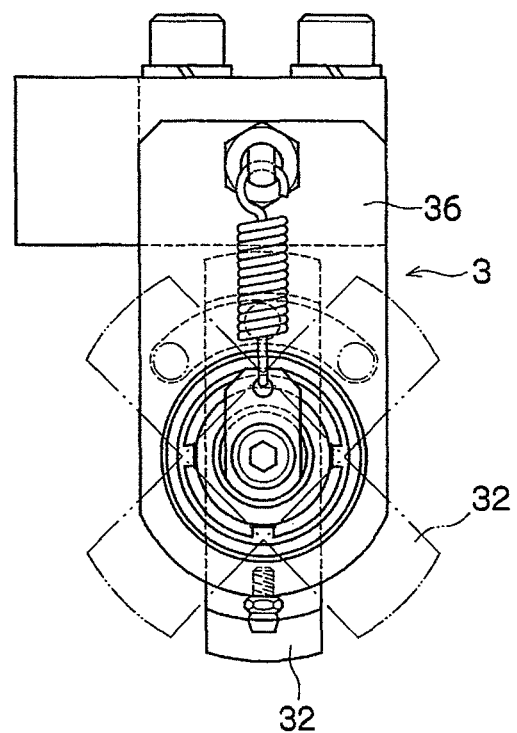
FIG. 6 is an enlarged top view showing the constitution of the first guide roller and the peripheries thereof in the coil winding machine of FIG. 1.

As shown in FIGS. 1 to 3, the core bar 2 has a flange portion 20 formed at its one end protruding outward in the radial direction thereof and a motor 24 attached to the other end thereof. By the motor 24, the core bar 2 rotates around the axis thereof in a direction in which the wire material W is wound. A clamping portion 22 is provided at one end of the core bar 2 to come in contact with, and separate away from, the core bar 2 and to rotate together with the core bar 2 adjacent to the flange portion. As the clamping portion 22 approaches the core bar 2, the wire material W is gripped on the core bar 2.

As shown in FIGS. 1 to 4, the first guide portion 3 includes a pair of first guide rollers 30 that rotate in contact with the wire material W, a support plate 32 supporting the first guide rollers 30 by shafts, a base plate 34 whose upper and lower ends are supported and guided by the ball screw mechanism 5, by the guide rail 7 and by the guide rail 8, and an arm member 36 supported, at its one end, by the base plate 34 and supports, at the other end, the support plate 32 so as to rotate around a vertical rotary axis.

As shown in FIGS. 1 and 2, the base plate 34 has a block. 34A fixed thereto to travel on the guide rail 7 and a block 34B fixed thereto to travel on the guide rail 8. The base plate 34 is guided by the block 34A and the block 34B along the guide rail 7 and the guide rail 8.

The first guide rollers 30 correspond to the first guide member of the invention and, as shown in FIGS. 2 to 6, have cylindrical side surfaces and are supported by the support plate 32 through rotary shafts 31. The rotary shafts 31 are arranged in an inverted V-shape as viewed from the side surfaces thereof and, therefore, the first guide rollers 30 are arranged in a V-shape as viewed from the side surfaces thereof. Therefore, the first guide rollers 30 are arranged so as to hold the passage of the wire material W from both sides thereof and, at the same time, come in contact with the surfaces of the upper side of the wire material W or, in other words, come in contact with the surfaces of the side opposite to the side that comes in contact with the core bar 2. Further, as shown in FIGS. 3 and 7A, by the support plate 32, the arm member 36, and the base plate 34, the first guide rollers 30 are driven in parallel with the axis of the core bar 2 in a state of being supported at a position close to the winding start position and on the side of the wire material-feeding means as viewed from the end surface of the core bar 2, or in other words, at a position offset toward the side of the second guide portion 4.

Referring to FIGS. 1 and 2, the arm member 36 is supported by the ball screw mechanism 35 that is provided on the base plate 34 so as to move up and down. The ball screw mechanism 35 is constituted of a ball screw 35A supported by the base plate 34, a nut portion 35B that is fixed to the arm member 36 and engages with the ball screw 35A, and a motor 35C that rotates the ball screw 35A. As the motor 35C rotates, the nut portion 35B moves up and down to set the height of the arm member 36 and the height of the support plate 32, and accordingly, the height of the first guide rollers 30 is also set.

Referring to FIGS. 1 to 3, the second guide portion 4 includes a pair of second guide rollers 40 that are supported so as to rotate about a pair of rotary shafts 41, a plate-like support plate 42 supporting the second guide rollers 40 rotatably, a base plate 44 whose upper and lower ends are supported and guided by the ball screw mechanism 6, by the guide rail 7 and by the guide rail 8, and an arm member 46 horizontally supported at the root portion thereof by the base plate 44 and supports at the end portion thereof the support plate 42 in parallel with a vertical plane.

The base plate 44 has a block 44A fixed thereto to travel on the guide rail 7 and a block 44B fixed thereto to travel on the guide rail 8. The base plate 44 is guided by the block 44A and the block 44B along the guide rail 7 and the guide rail 8.

The second guide rollers 40 correspond to the second guide member of the present invention and, as shown in FIGS. 1 to 3, have cylindrical side surfaces and are supported by the support plate 42 through rotary shafts 41. The second guide rollers 40, rotary shafts 41 and roller support plate 42 assume the arrangement that is turned upside down the arrangement of the first guide rollers 30, rotary shafts 31 and support plate 32 in the first guide portion 3 shown in FIGS. 4 to 6. Accordingly, since the rotary shafts 31 are arranged in the V-shape as viewed from the side surfaces thereof, the second guide rollers 40 are arranged in the inverted V-shape as viewed from the side surfaces thereof. Therefore, the second guide rollers 40 are arranged so as to hold the passage of the wire material W from both sides thereof and, at the same time, come in contact with the surfaces on the lower side of the wire material W or, in other words, come in contact with the surfaces on the side that comes in contact with the core bar 2. Further, as shown in FIGS. 3, 7A and 7B, by the support plate 42, the arm member 46 and the base plate 44, the second guide rollers 40 are arranged at a position closer to the wire material-feeding means than the first guide rollers 30, or in other words, at a position separated away from the core bar, and driven in parallel with the axis of the core bar 2.

Referring to FIGS. 1 and 2, the arm member 46 is supported by the ball screw mechanism 45 provided on the base plate 44 so as to move up and down. The ball screw mechanism 45 is constituted by a ball screw 45A supported by the base plate 44, a nut portion 45B that is fixed to the arm member 46 and engages with the ball screw 45A, and a motor 45C that rotates the ball screw 45A. As the motor 45C rotates, the nut portion 45B moves up and down so as to set the height of the arm member 46 and the height of the support plate 42, and accordingly, the height of the first guide rollers 40 also is set.

Referring to FIGS. 1 and 2, the ball screw mechanism 5 includes a ball screw 50 that is supported at its both ends in parallel with the board 9 and horizontally, a nut portion 52 that engages with the ball screw 50 and is secured to an upper portion of the base plate 34 of the first guide portion 3, and a motor 54 for rotating the ball screw 50.

Similarly, referring to FIGS. 1 and 2, the ball screw mechanism 6 includes a ball screw 60 that is supported at its both ends in parallel with the board 9 and horizontally, a nut portion 62 that engages with the ball screw 60 and is secured to an upper portion of the base plate 44 of the second guide portion 4, and a motor 64 for rotating the ball screw 60.

The function of the coil winding machine 1 will be described below.

Prior to starting the winding, the first guide portion 3 and the second guide portion 4 move to the winding start positions by the ball screw mechanism 5 and the ball screw mechanism 6. Therefore, as shown in FIG. 7A, the first guide rollers 30 and the second guide rollers 40 are held at positions adjacent to the flange portion 20 of the core bar 2.

The wire material W that is fed by the feeding means is guided by the first guide rollers 30, second guide rollers 40 and flange portion 20 in a direction at right angles with the axis of the core bar 2, and introduced into between the core bar 2 and the clamping portion 22.

After the wire material W that is introduced between the core bar 2 and the clamping portion 22, the wire material W is gripped at the winding start position by the clamping portion 22 and the core bar 2. The core bar 2 is then rotated in a direction in which the coil spring is wound as indicated by an arrow 'a'. At the same time, the first guide portion 3 and the second guide portion 4 are driven at a predetermined speed toward the other end of the core bar 2, i.e., toward the end on the side where the motor 24 is provided as indicated by arrows 'b' and 'c'. Accordingly as shown in FIGS. 7B and 8A, the wire material is spirally wound on the surface of the core bar 2 while maintaining a predetermined pitch angle θ1, and a coil spring is thus formed.

To increase the pitch angle from θ1 to θ2 on the way as shown in FIG. 8B, the moving speed vc of the second guide portion 4 is increased at first. Consequently, the wire material W is bent in a direction of an arrow 'c' with the first guide rollers 30 of the first guide member 3 as a center. After the wire material W is bent and the pitch angle has increased to θ2, the moving speed vb of the first guide portion 3 is increased toward a moving speed equal to the moving speed vc of the second guide portion 4, and the wire material W is continuously wound.

Figure 10:
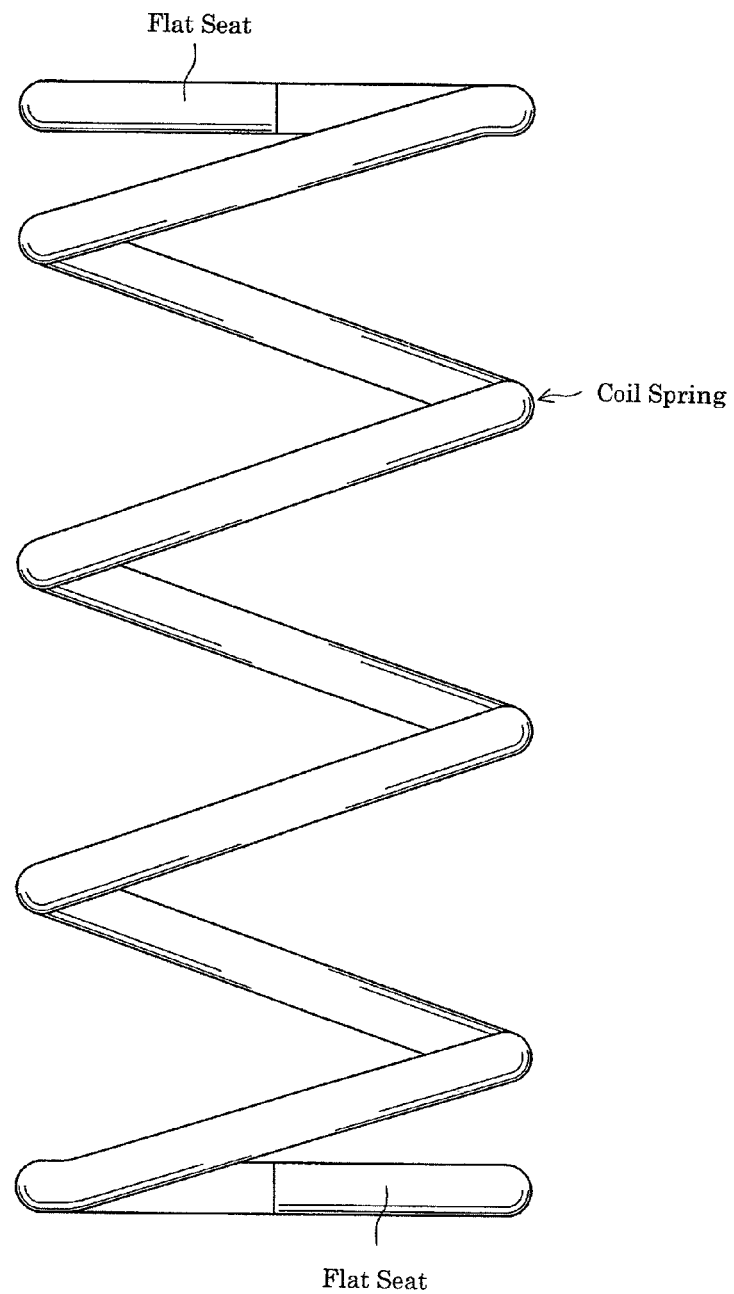
FIG. 10 is a side view illustrating a coil spring having flat seats at both ends thereof.

In addition, referring to FIG. 10, to form a coil spring having flat seats at both ends, the wire material W may be wound in a manner as described below. First, as shown in FIG. 9A, the core bar 2 is rotated in a state where the first guide portion 3 and the second guide portion 4 are standing at a position that is adjacent to the flange portion 20 of the core bar 2, and the wire material W is wound along the flange portion 20. A flat seat is thus formed. After the flat seat is formed, as shown in FIG. 93, the second guide portion 4 is moved firstly, and the wire material W is bent until the pitch angle θ1 is attained. After the wire material W is bent, the first guide portion 3 is moved at a speed equal to that of the second guide portion 4. After the wire material W is wound in a predetermined number of turns on the core bar 2, the second guide portion 4 stops firstly, and then the first guide portion 3 stops at a time when the pitch angle of the wire material wound on the core bar 2 has become 0.

In the coil winding machine 1 of the embodiment 1, the ball screw mechanism 5 and the ball screw mechanism 6 are driven and stopped so as to independently control the moving speed of the first guide rollers 30 in the first guide portion 3 and of the second guide rollers 40 in the second guide portion 4. Further, the first guide rollers 30 hold the wire material. W at a position offset from the winding start position of the clamping portion 22, and thus, the pitch and the pitch angle of the wire material W can be controlled from the start of winding.

Therefore, flat seats can be easily formed at both ends of the coil spring. Further, as shown in FIGS. 9A and 9B, the coil spring can be wound at the predetermined pitch angle θ1 immediately from the flat seat. Accordingly, a coil spring having an even spring characteristics, not allowing a wire material to be rubbed when contracted, and accordingly, not allowing a coating on the surface to be peeled odd and, hence, maintaining a strong resistance against the corrosion can be obtained.

Figure 11:
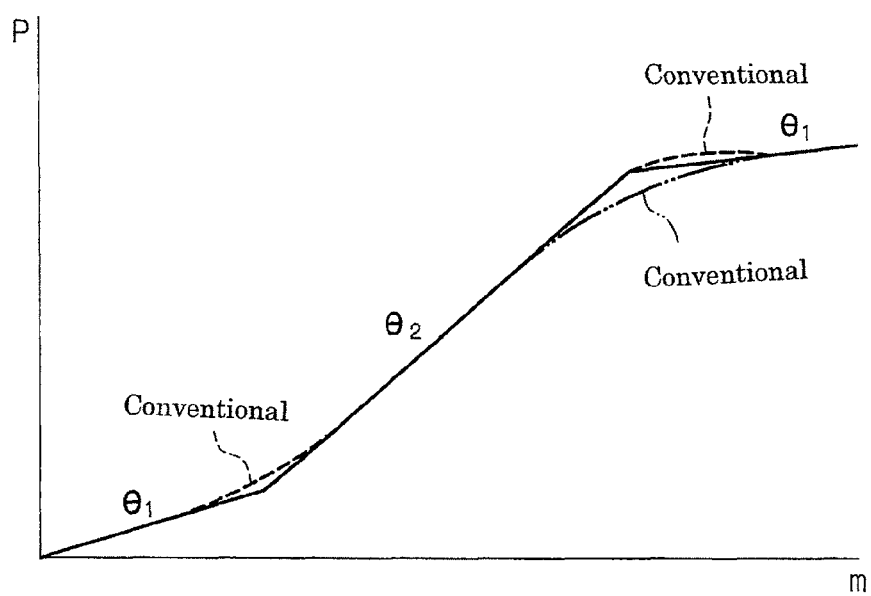
FIG. 11 is a diagram illustrating relationships between the pitch of the coil spring and the number of turns of the wire material when the pitch angle is increased from θ1 to θ2 and is returned again to θ1 on the way of forming the coil spring by using the coil winding machine of the embodiment 1 and a conventional coil winding machine.

Additionally, as represented by a solid line in FIG. 11, when the pitch angle is increased from θ1 to θ2 and when the pitch angle is again turned to θ1 on the way of winding a coil spring, the pitch angle of the coil spring can be correctly controlled. On the other hand, as represented by a broken line or a two-dot chain line in FIG. 11, when forming the coil spring by a conventional coil winding machine, a shifting portion where the pitch angle shifts from θ1 to θ2 and from θ2 to θ1 is necessarily provided at portions of the coil spring where the pitch changes.

In the first guide portion 3, further, since the wire material W is pushed by the pair of guide rollers 30 from the upper side and in the second guide portion 4, the wire material. W is pushed by the pair of guide rollers 40 from the lower side, the wire material W can be smoothly fed.

2. Embodiment 2

Another embodiment of the coil winding machine included in the coil spring forming apparatus of the present invention described below. Hereinafter, the reference numerals same as those of FIG. 1 to FIGS. 9A and 9B denote the same elements as those shown in these drawings.

Figure 12:
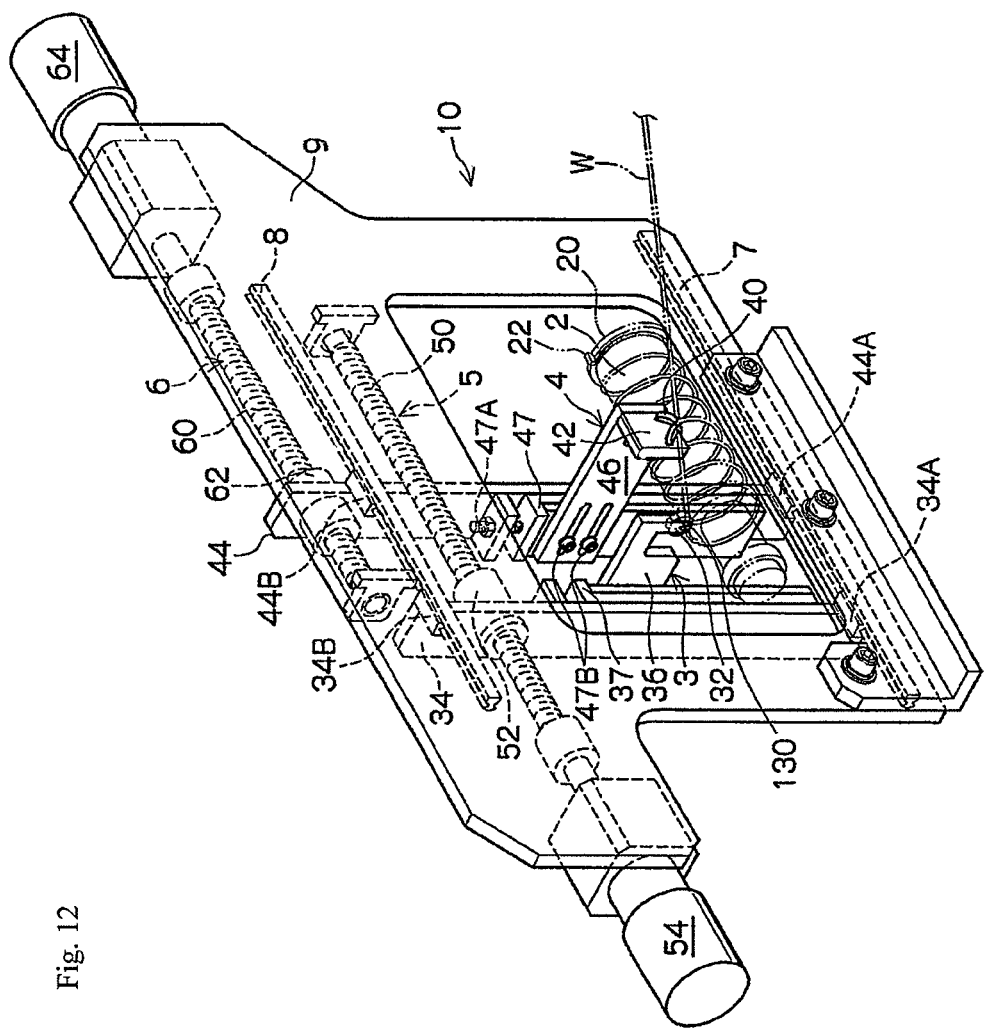
FIG. 12 is a perspective view showing the whole constitution of the coil winding machine according to an embodiment 2.

Referring to FIG. 12, the coil winding machine 10 according to the embodiment 2 includes the cylindrical core bar 2 on which the wire material W is to be wound, and the first guide portion 3 and the second guide portion 4 for guiding the wire material W fed from the feeding means (not shown) toward the core bar 2.

Figure 13:
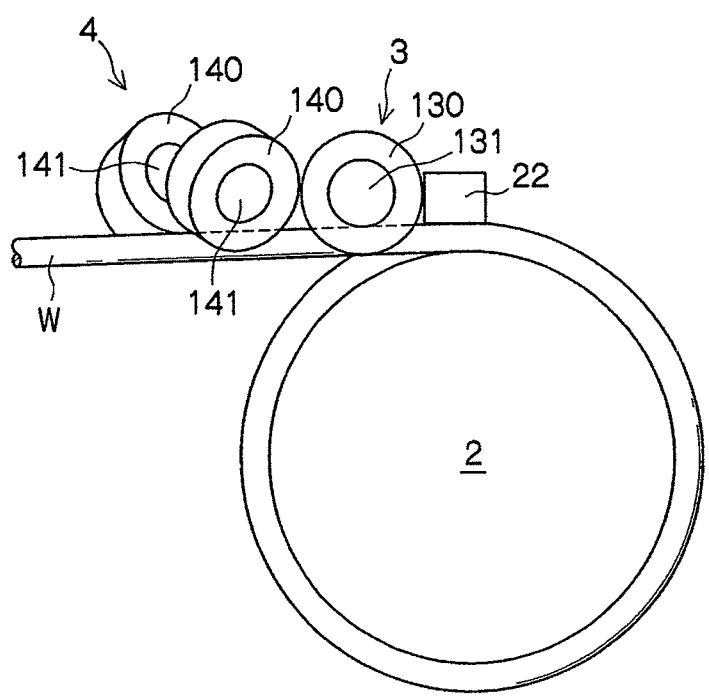
FIG. 13 is a schematic view showing the constitution of a first guide roller, a second guide roller, a core bar and peripheries thereof in the coil winding machine according to the embodiment 2.
Figure 14:
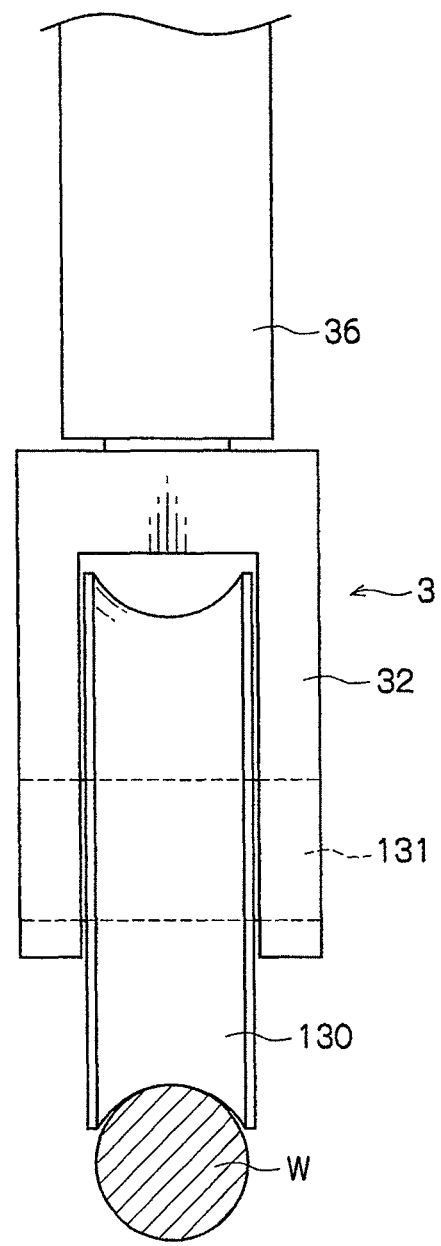
FIG. 14 is a view showing, on an enlarged scale, the constitution of the first guide roller and the peripheries thereof in the coil winding machine of FIG. 12.

As shown in FIGS. 12, 13 and 14, the first guide portion 3 includes a first guide roller 130 that rotates in contact with the wire material W, the support plate 32 supporting the first guide rollers 130 so as to rotate about a horizontal rotary shaft 131, the base plate 34 whose upper and lower ends are supported and guided by the ball screw mechanism 5, by the guide rail 7 and by the guide rail 8, and the arm member 36 supported, at its one end, by the base plate 34 and supports, at the other end, the support plate 32 so as to rotate about a vertical rotary shaft.

Figure 16A:
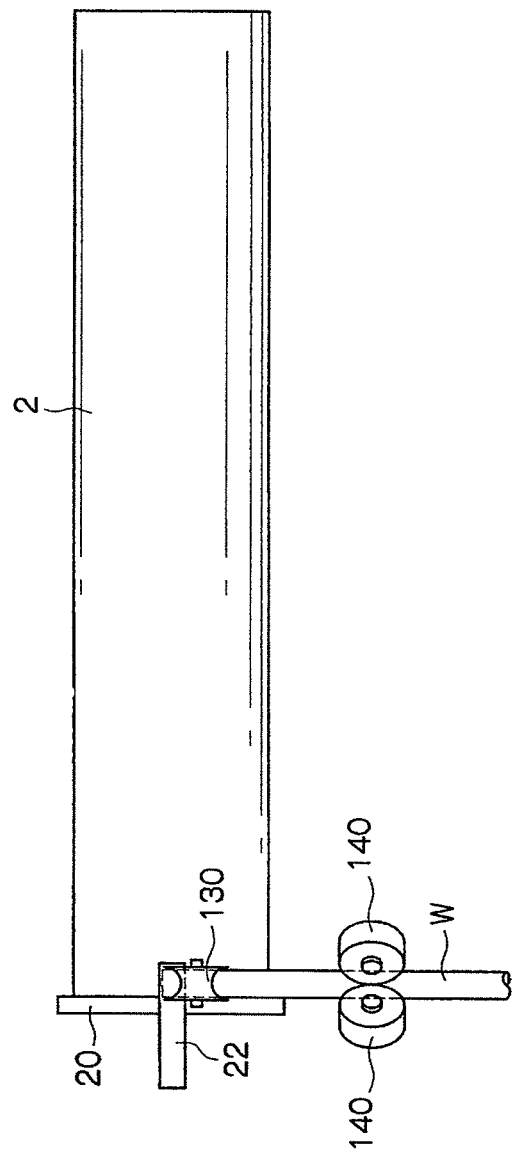
FIG. 16A is a view illustrating the motions of the first guide roller and the second guide roller at the start of winding by feeding the wire material to the core bar in the coil winding machine of FIG. 12.

The first guide roller 130 corresponds to the first guide member of the invention and, as shown in FIG. 14, is formed like a pulley with its side surface being recessed in an arcuate shape, and comes in contact with the wire material W at the arcuately recessed side surface thereof. Further, as shown in FIGS. 13 and 16A, by the support plate 32, the arm member 36 and the base plate 34, the first guide roller 130 moves in parallel with the axis of the core bar 2 in a state of being supported on the side of the wire material-feeding means close to the winding start position as viewed from the end surface of the core bar 2, or in other words, at a position offset toward the side of the second guide portion 4.

Referring to FIG. 12, the arm member 36 is supported by the base plate 34 via a height-adjusting member 37. The height-adjusting member 35 is constituted so as to move up and down relative to the base plate 34 by a height-adjusting screw (not shown). By moving the height-adjusting member 37 up and down, the heights of the arm member 36 and the support plate 32 can be set, and accordingly, the height of the first guide roller 130 can also be set.

Figure 15:
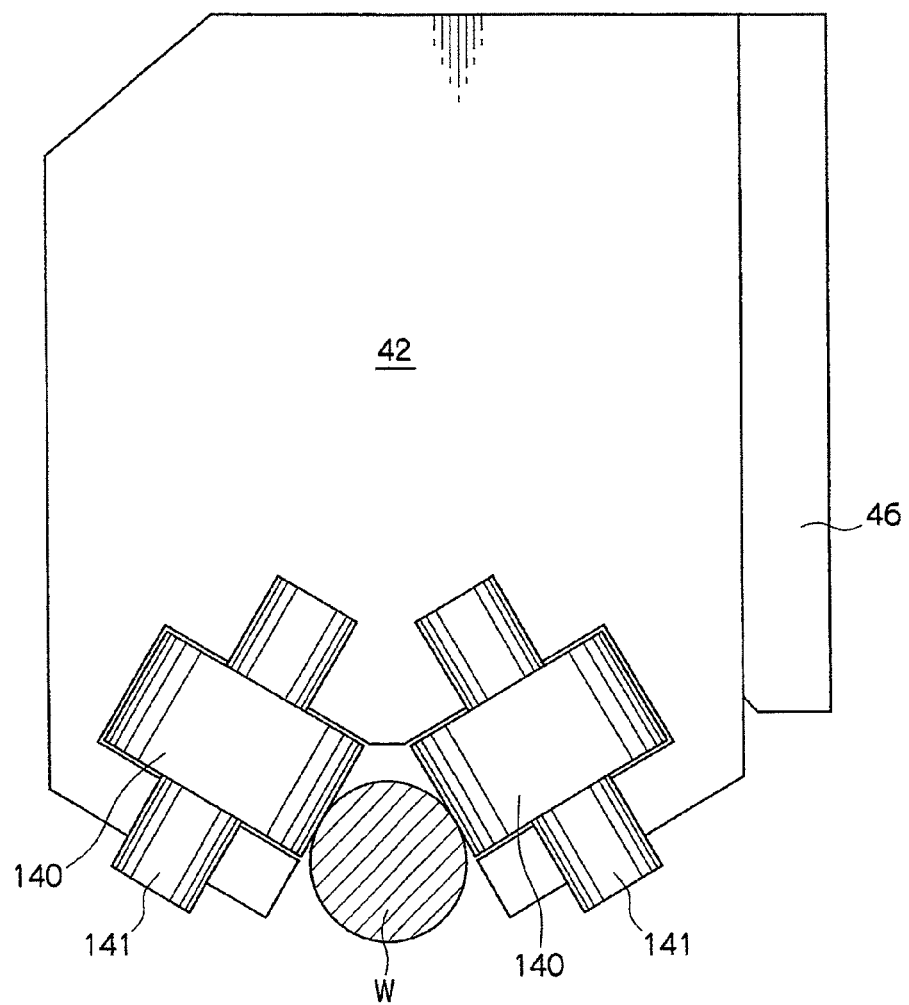
FIG. 15 is a view showing, on an enlarged scale, the constitution of the second guide roller and the peripheries thereof in the coil winding machine of FIG. 12.

Referring to FIGS. 12, 13 and 15, the second guide portion 4 includes a pair of second guide rollers 140 that are supported so as to rotate about a pair of rotary shafts 141, the plate-like support plate 42 supporting the pair of rotary shafts 141 in the form of an inverted V-shape as viewed from the front, the base plate 44 whose upper and lower ends are supported and guided by the ball screw mechanism 6, guide rail 7 and guide rail 8, and the arm member 46 horizontally supported, at its root portion, by the base plate 44 and supports, at an end thereof, the support plate 42 in parallel with the vertical plane.

As shown in FIG. 15, the second guide rollers 140 have a cylindrical side surface. As described above, the two second guide rollers 140 are supported by the rotary shafts 141 in a manner that the space is widened upward. Therefore, the second guide rollers 140 are arranged so as to hold the passage of the wire material W from both sides thereof and, at the same time, come in contact with the surfaces on the upper side of the wire material W, or in other words, come in contact with the surfaces on the side opposite to the side that comes in contact with the core bar 2.

Referring to FIG. 12, the arm member 46 is mounted on the height-adjusting member 47 by a screw 45B, and the height-adjusting member 47 is mounted on the base plate 44 by a height-adjusting screw 47A so as to move up and down. Further, an elongated hole is opened in the root portion of the arm member 46 in the horizontal direction so that the screw 47B is inserted therein. The second guide rollers 140 can be set for their height by moving the height-adjusting member 47 up and down relative to the base plate 44 by using the height-adjusting screw 47A and can be set for their position in the horizontal direction by moving the arm member 46 in the horizontal direction with the screw 47B being loosed. The second guide rollers 140 are held at a position separated farther than the first guide roller 130 in the first guide portion 3 from the core bar 2.

Except the above-mentioned respects, the coil winding machine 10 has the same constitution as that of the coil winding machine 1 of the embodiment 1.

The function of the coil winding machine 10 will be described below.

Prior to starting the winding, the first guide portion 3 and the second guide portion 4 is moved to the winding start positions by the ball screw mechanism 5 and the ball screw mechanism 6. Therefore, as shown in FIG. 16A, the first guide rollers 130 and the second guide rollers 140 are held at positions adjacent to the flange portion 20 of the core bar 2.

The wire material W fed by the feeding means is guided by the first guide rollers 130, second guide rollers 140 and flange portion 20 in a direction perpendicular to the axis of the core bar 2, and is introduced between the core bar 2 and the clamping portion 22.

Figure 16B:
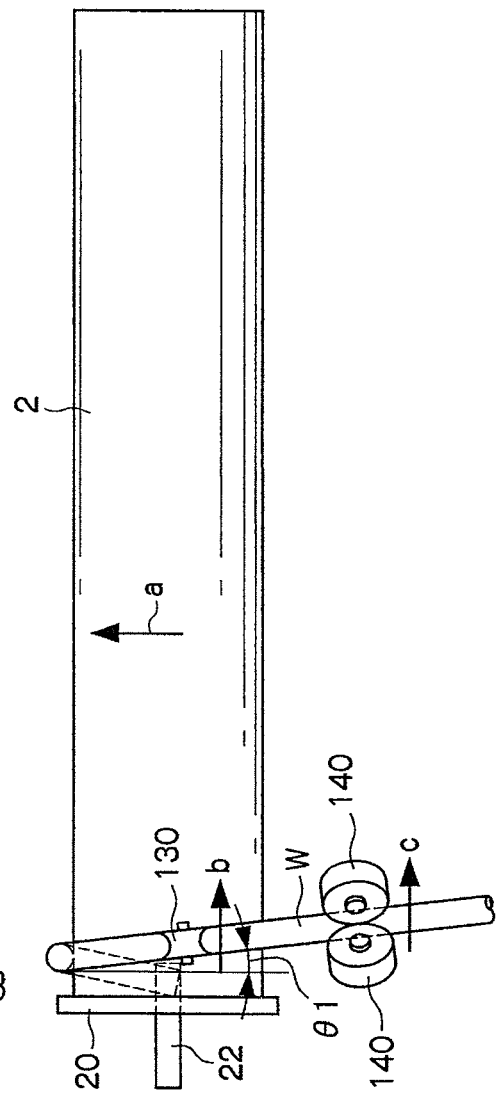
FIG. 16B is a view illustrating the motions of the first guide roller and the second guide roller at the start of winding the wire material on the core bar at the pitch angle θ1 in the coil winding machine of FIG. 12.

The wire material W introduced between the core bar 2 and the clamping portion 22, is, thereafter, gripped at the winding start position by the clamping portion 22 and the core bar 2. The core bar 2 is then rotated in a direction in which the coil spring is wound as indicated by an arrow 'a'. At the same time, the first guide portion 3 and the second guide portion 4 are driven at a predetermined speed toward the other end of the core bar 2, i.e., the end on the side where the motor 24 is provided as indicated by arrows 'b' and 'c'. Accordingly, as shown in FIG. 16B, the wire material is spirally wound on the surface of the core bar 2 while maintaining a predetermined pitch angle $\theta1$, and a coil spring is thus formed.

DESCRIPTION OF REFERENCE NUMERALS

1—coil winding machine
2—core bar
3—first guide portion
4—second guide portion
5—ball screw mechanism
6—ball screw mechanism
7—guide rail
8—guide rail
9—board
10—coil winding machine
20—flange portion
22—clamping portion
24—motor
30—first guide roller
32—roller support portion
34—base plate
35—height-adjusting member
36—arm member
40—second guide roller
41—rotary shaft
42—support plate
44—base plate
45—ball screw mechanism
45A—ball screw
45B—nut portion
45C—motor
46—arm member
47—height-adjusting member
50—ball screw
52—nut portion
54—motor
60—ball screw
62—nut portion
64—motor
130—first guide roller
140—second guide roller

What is claimed is:

1. A method of manufacturing a coil spring comprising:
   feeding a wire material between a core bar and a clamping portion through a first guide portion and a second guide portion;
   gripping the wire material on the core bar with the clamping portion which rotates integrally with the core bar;
   rotating the core bar as the first guide portion and the second guide portion are moving at a predetermined speed toward the other end of core bar so as to maintain a first pitch angle $\theta1$;
   changing the speed of the second guide portion so that the pitch angle is changed from the first pitch angle $\theta1$ to a second pitch angle $\theta2$; and
   changing the speed of the first guide portion so as to become the same speed with the second guide portion.

2. A method of manufacturing a coil spring comprising:
   feeding a wire material between a core bar and a clamping portion through a first guide portion and a second guide portion, wherein the first guide portion and the second guide portion are standing at a position that is adjacent to a flange portion of the core bar;
   gripping the wire material on the core bar with the clamping portion which rotates integrally with the core bar;
   rotating the core bar without moving the first guide portion and the second guide portion so as to maintain a first pitch angle $\theta1$ to be 0;
   moving the second guide portion so that the pitch angle is changed from the first pitch angle $\theta1$ to a second pitch angle $\theta2$; and
   moving the first guide portion in the same speed with the second guide portion.

3. The method of manufacturing a coil spring according to claim 2, further comprising:
   stopping the second guide portion after the wire material is wound in a predetermined number of turns on the core bar; and
   stopping the first guide portion when the pitch angle becomes 0.

4. A coil spring manufactured by the method according to claim 1.

5. A coil spring manufactured by the method according to claim 2.

6. A coil spring manufactured by the method according to claim 3.

* * * * *